United States Patent
Chowdhury

(10) Patent No.: US 7,406,317 B2
(45) Date of Patent: Jul. 29, 2008

(54) MAINTAINING A COMMUNICATIONS SESSION WITH A MOBILE STATION

(75) Inventor: Kuntal Chowdhury, Plano, TX (US)

(73) Assignee: Nortel Networks Limited, St. Laurent, Quebec (CA)

( * ) Notice: Subject to any disclaimer, the term of this patent is extended or adjusted under 35 U.S.C. 154(b) by 1121 days.

(21) Appl. No.: 10/606,998

(22) Filed: Jun. 26, 2003

(65) Prior Publication Data

US 2004/0266450 A1 Dec. 30, 2004

(51) Int. Cl.
*H04Q 7/00* (2006.01)
(52) U.S. Cl. ............... 455/452.2; 455/552.1; 370/249; 709/232
(58) Field of Classification Search ........... 455/403, 455/411, 423–424, 452.2, 517, 520, 452.3, 455/554.2, 556.1, 412.1, 422.1, 445, 456.1, 455/434, 450, 421; 370/249, 329, 338, 401, 370/352, 357; 379/231–232
See application file for complete search history.

(56) References Cited

U.S. PATENT DOCUMENTS

| | | | |
|---|---|---|---|
| 6,654,360 B1 * | 11/2003 | Abrol | 370/329 |
| 7,245,931 B2 * | 7/2007 | Wang et al. | 455/515 |
| 2002/0167905 A1 * | 11/2002 | Wenzel et al. | 370/249 |
| 2004/0008649 A1 * | 1/2004 | Wybenga et al. | 370/338 |
| 2004/0248577 A1 * | 12/2004 | Sayeedi | 455/445 |
| 2005/0003798 A1 * | 1/2005 | Jones et al. | 455/410 |
| 2005/0003799 A1 * | 1/2005 | Kang | 455/411 |
| 2005/0111377 A1 * | 5/2005 | Lioy et al. | 370/252 |

OTHER PUBLICATIONS

Tia Interim Standard, "cdma2000 Wireless IP Network Standard," Telecommunications Industry Association, pp. 1-98 (Sep. 2002).
TR 45, "cdma2000 Wireless IP Network Standard-Addendum 1," pp. 1-60 (Apr. 2001).
W. Simpson, Network Working Group, Request for Comments: 1570, "PPP LCP Extensions," pp. 1-17 (Jan. 1994).
W. Simpson, Network Working Group, Request for Comments: 1661, The Point-to-Point Protocol (PPP), pp. 1-47 (Jul. 1994).
S. Cobb, Network Working Group, Request for Comments: 1877, "PPP Internet Protocol Control Protocol Extensions for Name Server Addresses," pp. 1-6 (Dec. 1995).
C. Rigney, Network Working Group, Request for Comments: 2138, Remote Authentication Dial in User Service (RADIUS), pp. 1-57 (Apr. 1997).
G. Zorn, Network Working Group, Request for Comments: 2484, "PPP LCP Internationalization Configuration Option," pp. 1-5 (Jan. 1999).
T. Hiller et al., Network Working Group, Request for Comments: 3141, "CDMA Wireless Data Requirements for AAA," pp. 1-15 (Jun. 2001).

* cited by examiner

*Primary Examiner*—Binh K. Tieu
(74) *Attorney, Agent, or Firm*—Trop, Pruner & Hu, P.C.

(57) ABSTRACT

A mobile communications network includes various entities, such as a mobile station, a radio network, and a packet data node. In one implementation, the mobile station is enabled for an always-on service. In response to detecting that the mobile station is an always-on mobile station, the packet-data node denies requests from the radio network to tear down a packet data session of the mobile station unless some predetermined criterion has been met.

25 Claims, 2 Drawing Sheets

MAINTAINING A COMMUNICATIONS SESSION WITH A MOBILE STATION

TECHNICAL FIELD

This invention relates to maintaining a communications session with a mobile station.

BACKGROUND

A mobile communications network is typically made up of a plurality of cells. Each cell includes a radio base station, with each base station connected to a mobile switching center or a packet service node that manages communications sessions between mobile stations and terminals coupled to a public switched telephone network (PSTN) or a packet-based data network. Communications between mobile stations and base stations are performed over wireless links.

Traditional wireless protocols provide for circuit-switched communications. Such protocols include time-division multiple access (TDMA) protocols and code-division multiple access (CDMA) protocols. In a circuit-switched network, a channel portion between two endpoints (e.g., two mobile stations) is occupied for the duration of the connection between the endpoints.

However, with the wide availability of the Internet and intranets, packet-switched communications (e.g., web browsing, electronic mail, and so forth) have become more common. Generally, a circuit-switched connection is an inefficient technique for communicating packet data. As a result, third generation (3G) and beyond wireless technologies are being developed and implemented to provide higher bandwidth and more efficient packet-switched communications (of data as well as voice and other forms of real-time data) over wireless networks.

One example of a packet-switched wireless technology is defined by the CDMA 2000 family of standards, developed by the Third Generation Partnership Project 2 (3GPP2). A CDMA 2000 wireless communications network is capable of supporting both circuit-switched services and packet-switched services. For TDMA, packet-switched wireless communications protocols have also been developed, such as the Enhanced General Packet Radio Service (EGPRS) protocol as defined by the 3GPP (Third Generation Partnership Project) UMTS (Universal Mobile Telecommunications System) Release 1999 Standard, and others.

In packet-switched communications, packets that are sent across a data network are routed based on a source network address and a destination network address contained in each packet. In one example, packets sent over a packet-based data network are defined by the Internet Protocol (IP).

Once a packet data session is established between a mobile station and another end device, communications of packet data can occur between the mobile station and the other end device. Typically, in response to a teardown request, the packet data session is terminated. CDMA 2000 provides an always-on feature that is intended to maintain a subscriber's packet data session on a data network so that the mobile network does not initiate release of the subscriber's packet data session unless the mobile network determines that the subscriber is no longer reachable. However, an efficient messaging mechanism has not been provided to handle the release of an always-on mobile station.

SUMMARY

In general, an efficient mechanism is provided to maintain a packet data session of a mobile station. For example, according to one embodiment, a method for use in a mobile communications network includes receiving a request to terminate a communications session with the mobile station. In response to receiving the request to terminate, an indicator is checked to determine whether the communications session is to be maintained for the mobile station. In response to determining that the communications session is to be maintained for the mobile station, the method generates a message to deny the request to terminate the communications session.

Other or alternative features will become apparent from the following description, from the drawings, and from the claims.

DETAILED DESCRIPTION

In the following description, numerous details are set forth to provide an understanding of the present invention. However, it will be understood by those skilled in the art that the present invention may be practiced without these details and that numerous variations or modifications from the described embodiments may be possible.

Figure 1:
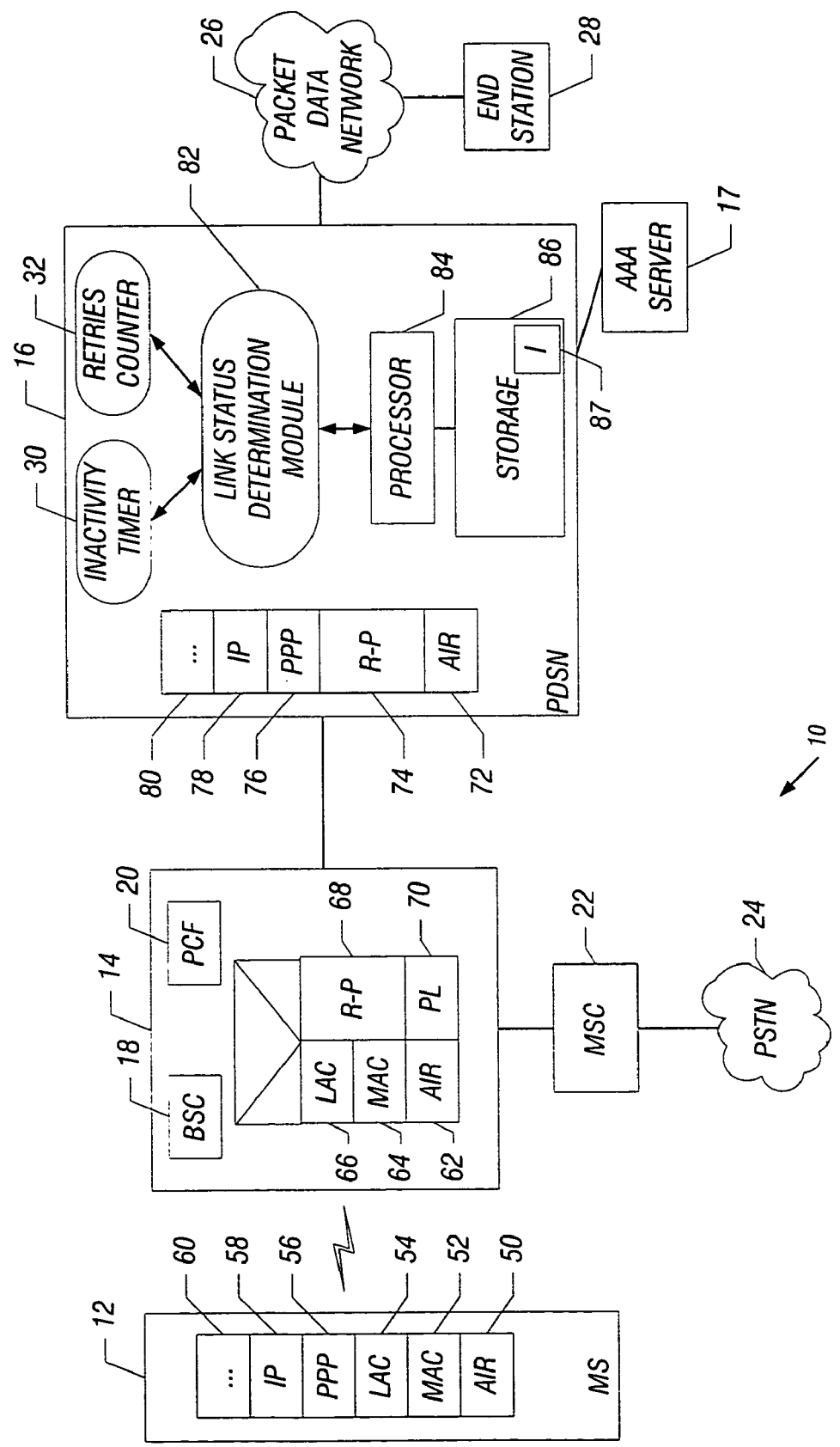
FIG. 1 is a block diagram of an example arrangement of a mobile or wireless communications network that is coupled to a packet data network and a public switched telephone network (PTSN).

FIG. 1 illustrates an example arrangement that includes a mobile or wireless communications network 10, which has a mobile station 12, a radio network 14, and a packet data serving node (PDSN) 16. The example mobile communications network 10 of FIG. 1 is according to a code-division multiple access (CDMA) 2000 protocol, defined by the CDMA 2000 family of standards, as promulgated by the Third Generation Partnership Project 2 (3GPP2). A CDMA 2000 wireless network is capable of supporting both circuit-switched services and packet-switched services. TIA/EIA/IS-835 is a standard that defines requirements for support of wireless packet data networking capability in a CDMA 2000 network. One version of TIA/EIA/IS-835 is IS-835-B.

Although described in the context of a CDMA 2000 network, other embodiments of the invention can be implemented in other types of mobile communications networks, such as other CDMA-based networks including 1×EV-DO, 1×EV-DV, and so forth. Alternatively, such other types of mobile communications networks can also include time-division multiple access (TDMA) networks, such as networks that conform to the Enhanced General Packet Radio Service (EGPRS) protocol, as defined by the 3GPP UMTS (Universal Mobile Telecommunication System) standards. The wireless protocols listed above are provided as examples only, and are not to be considered limiting, as other types of protocols in a wireless network can be used in other embodiments. Furthermore, even though described in the context of a wireless network that supports packet-switched communications, the invention is also not to be limited in that regard. Other embodiments of the invention can be implemented in circuit-switched communications networks.

The mobile station 12 is capable of communicating over a wireless link with the radio network 14, which includes a base station controller 18 and a packet control function (PCF) 20. The BSC 18 communicates over the wireless link with the mobile station 12. For circuit-switched communications, the BSC 18 communicates control and data information to the mobile switching center (MSC) 22, which is in turn coupled to a public switched telephone network (PSTN) 24, or to other MSCs. For packet-switched communications, the BSC 18 communicates control and data information through the PCF 20 to the PDSN 16. The PCF 20 manages the relay of packets between the BSC 18 and the PDSN 16. The PDSN establishes, maintains, and terminates link layer (e.g., PPP) and network layer sessions (e.g., Simple IP and Mobile IP) to mobile stations, and routes mobile station-originated or mobile station-terminated packet data traffic. The PDSN 16 is coupled to a packet data network 26, such as a local area network (LAN), wide area network (WAN), or a public network such as the Internet. The packet data network 26 is coupled to various nodes, such as an end station 28, which can be a computer, a network telephone, or the like.

As used here, the term "radio network" refers to any entity or collection of entities (in any one of a CDMA, TDMA, or other type of mobile network) that controls radio communication with mobile stations within a predefined coverage area, such as a cell, cell sector, or group of cells or cell sectors. More generally, a "wireless network" refers to any entity or collection of entities that controls wireless communication with mobile stations in a predefined coverage area. In addition, the term "packet data node" refers to an entity or collection of entities in the mobile network that provides the interface between the mobile network and a packet data network. One example of a packet data node is the PDSN 16.

Examples of packet-switched communications include web browsing, electronic mail, text chat sessions, file transfers, interactive game sessions, voice-over-IP (internet protocol) sessions, and so forth. In one embodiment, packet-switched communications utilize a connectionless internetwork layer defined by IP. One version of IP is IPv4, described in RFC 791, entitled "Internet Protocol," dated September 1981; and another version of IP is IPv6, described in RFC 2460, entitled "Internet Protocol, Version 6 (IPv6) Specification," dated December 1998. In packet-switched communications, packets or other units of data carry routing information (in the form of network addresses) that are used to route the packets or data units over one or more paths to a destination endpoint.

According to some embodiments of the invention, the mobile station 12 is an always-on mobile station. One implementation of an always-on feature is defined by IS-835-B, entitled "CDMA 2000 Wireless IP Network Standard," dated September 2002. An "always-on service" refers to a service in which a communications session involving a mobile station, such as mobile station 12, is maintained even though there has been some period of inactivity. An "always-on mobile station" refers to a mobile station that has subscribed to or is enabled for the always-on feature. Although a version of CDMA 2000 provides for always-on service, it is contemplated that other wireless network protocols can also provide for such service.

According to some embodiments of the invention, the PDSN 16 determines whether a particular mobile station is an always-on mobile station. For such mobile stations, the PDSN 16 keeps track of the activity of the mobile station 12. When inactivity is detected, such as by use of an inactivity timer, the PDSN 16 sends an echo message to the mobile station to determine whether the mobile station is still "connected" to the communications session. As used here, being "connected" to a communications session refers to a mobile station or other entity being capable of transmitting or receiving data in the communications session, which can be a packet communications session between the mobile station and another device. As an example, the packet communications session may be a Point-to-Point Protocol (PPP) communications session. PPP is described by RFC 1661, entitled "The Point-to-Point Protocol (PPP)," dated July 1994.

An inactivity timer 30 in the PDSN detects for inactivity for each communications session involving the mobile station 12. The initial value of the inactivity timer 30 is programmed or set by a service provider, with example values being in the range between about five minutes to five hours. Note that there are multiple inactivity timers 30 for corresponding communications sessions involving multiple mobile stations. When the inactivity timer 30 expires, the PDSN 16 sends an echo request message to the mobile station 12. If the mobile station 12 is still connected to the communications session, then the mobile station 12 is able to provide a reply to the echo message. However, if the mobile station does not respond to the echo message, then the PDSN 16 decrements (or increments), as appropriate, a "retries" counter 32, which is a counter that tracks the number of times the PDSN 16 has attempted to seek a reply from the mobile station 12 with the echo message. For the ensuing discussion, it is assumed that the retries counter 32 starts with a non-zero value (e.g., 2 to 10) programmed or set by a service provider, with the retries counter 32 being decremented each time the PDSN 16 is unable to receive an echo reply message from the mobile station. Prior to the retries counter 332 reaching the value zero, the PDSN 16 does not allow the communications session of the mobile station 12 to be terminated. However, once the retries counter 32 has decremented to the value zero, that is an indication that the mobile station 12 may be unreachable, so that the PDSN 16 allows the teardown of the communications session. Alternatively, the retries counter 32 starts with a zero value and is incremented with each attempt until the retries counter 32 reaches a predetermined value.

In accordance with some embodiments of the invention, an efficient mechanism is provided for controlling whether or not to teardown a communications session involving the mobile station 12 due to inactivity. This mechanism involves the PDSN 16 either acknowledging or not acknowledging a request from the BSC 18 to tear down a communications session. An acknowledge (or ACK) indication allows the BSC 18 to perform the teardown, whereas a no-acknowledge (or NACK) is an indication to the BSC 18 that teardown should not be performed. A benefit provided by some embodiments of the invention is that BSC 18 does not need to keep track of whether the mobile station 12 is an always-on mobile station. Rather, the intelligence is provided by the PDSN 16, with the PDSN 16 providing the appropriate response to a request from the BSC 18 to terminate a communications session to control whether the BSC 18 is allowed to perform the session teardown.

FIG. 1 further shows layers within the mobile station 12, radio network 14, and PDSN 16 to enable communication among the respective nodes of the mobile communications network 10. The various layers conform to the CDMA 2000 standard.

The mobile station 12 includes an airlink layer 50 (which enables radio frequency communications over the air link between the mobile station 12 and the radio network 14), a medium access control (MAC) layer 52, a link access control (LAC) layer 54, a PPP layer 56, and an IP layer 58. Additionally, layer(s) 60 are also logically provided above the IP layer 58. Examples of the functions of such other layers 60 include layers that provide for mobile IP, and so forth.

The radio network 14 also includes various layers, which can be implemented in the BSC 18 and/or PCF 20. The air interface (the interface to the mobile station 12) includes an airlink layer 62, a MAC layer 64, and an LAC layer 66. The interface to the PDSN 16 includes an R-P (radio network-PDSN) layer 68, and a physical layer 70. Similarly, the PDSN 16 includes a physical layer 72, an R-P layer 74, a PPP layer 76, an IP layer 78, and other layers 80. The PPP layer 76 in the PDSN 16 interacts with the PPP layer 56 in the mobile station 12 to establish a PPP session.

In addition to the various layers, the PDSN 16 also includes a link status determination module 82, which is responsible for determining whether a particular session involving the mobile station 12 is to be torn down or not. The link status determination module 82, the inactivity timer 30, and the retries counter 32 can be implemented in the PPP player 76 or at some other layer in the PDSN 16 (e.g., an application layer). The software modules making up the link status determination module 82, the inactivity timer 30, and the retries counter 32 are executable on a processor 84, which is coupled to storage 86 (e.g., memory, a mass storage device, and so forth). Instead of being implemented in software, the link status determination module 82, the inactivity timer 30, and the retries counter 32 can be implemented in hardware.

Figure 2:
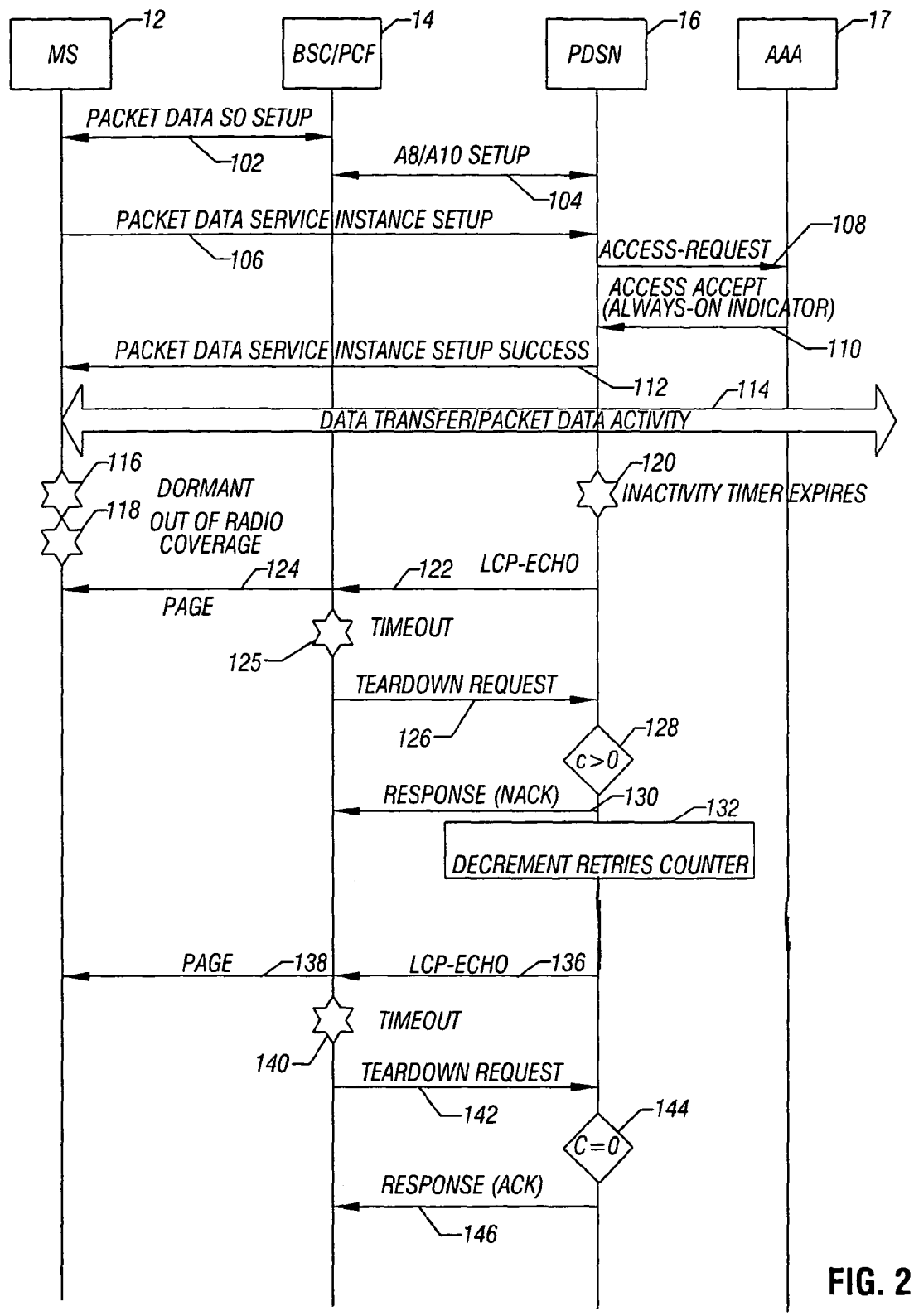
FIG. 2 is a message flow diagram of a procedure for determining whether a communications session for an always-on mobile station is to be released, in accordance with one embodiment of the invention.

FIG. 2 shows a message flow diagram of a procedure to determine whether teardown of a packet data session involving an always-on mobile station is to be allowed, in accordance with one embodiment. Initially, messaging is exchanged (at 102) between the mobile station 12 and the radio network 14 to set up a packet data session, referred to as a packet data service option setup. This setup procedure enables the mobile station 12 to be connected to a communications session that also involves an endpoint on the packet data network 26 or another mobile station. In response to the packet data service option setup, the radio network 14 performs an A8/A10 setup (at 104) with the PDSN 16. An A8 interface is provided between the BSC 18 and PCF 20 to carry user traffic, and an A9 interface is provided between the same entities to carry signaling. Similarly, an A10 interface is provided between the PCF 20 and the PDSN 16 for carrying user traffic, and an A11 interface is defined between these entities to carry signaling. A8/A10 setup refers to the setup of the A8 and A10 connections between the respective entities (BSC 18, PCF 20, and PDSN 16).

Once the A8/A10 connections are established, a packet data service instance setup is performed (at 106) to exchange various messaging between the mobile station 12 and PDSN 16. This includes exchanges of messaging to perform link layer procedures to start the establishment of a PPP session. Messages are also exchanged to negotiate compression and other items for the PPP session. Also, messages are exchanged between the mobile station 12 and PDSN 16 for mobile IP registration. Mobile IP enables a mobile station to change its point of attachment between different networks (such as a home network and foreign network). Mobile IP is defined by the Mobile Internet Protocol, as described in RFC 3344, entitled "IP Mobility Support for IPv4," dated August 2002. A version of mobile IP also exists for IPv6.

In the link layer procedures (at 106), the PDSN 26 sends a Link Control Protocol (LCP) Configure-Request message for a new PPP session to the mobile station 12. LCP, which is part of PPP, is used for establishing, configuring, and testing a data-link connection. If configuration options contained in the Configure-Request message are recognizable by the mobile station 12, the mobile station 12 returns a Configure-Ack message.

Further, for authentication purposes, the PDSN sends (at 108) an Access-Request message to an AAA (Authentication, Authorization, and Accounting) server 17 (FIG. 1). The AAA server 17 is an entity that is defined to enable mobility of nodes between different wireless networks. The AAA server 17 also provides authentication and authorization services for network nodes. AAA is described in RFC 2977, entitled "Mobile IP Authentication, Authorization, and Accounting Requirements," dated October 2000. The CDMA 2000 requirements for AAA are described in RFC 3141, entitled "CDMA 2000 Wireless Data Requirements for AAA," dated June 2001.

Note that although reference is made to mobile IP, other embodiments of the invention can be applied to communications sessions that employ simple IP (where mobility of a mobile station between different networks is not supported).

The Access-Request message sent (at 108) by the PDSN 16 to the AAA server 17 contains the network address identifier (NAI) of the mobile station 12 and information used for authentication purposes. If the AAA server 17 recognizes the mobile station 12, it sends an Access-Accept message (at 110) back to the PDSN 16. The Access-Accept message contains an always-on indicator to indicate that the mobile station 12 is associated with the always-on feature. Other information contained in the Access-Accept message may include the IP address of the DNS (domain name system) server, configuration information, and so forth.

Various information in the Access-Accept message are stored by the PDSN 16 in the storage 86 (FIG. 1). Among the information stored is an always-on indicator 87 (FIG. 1) to indicate that a given mobile station is an always-on mobile station. The PDSN 16 next sends (at 112) messaging back to the mobile station 12 to indicate that the packet data service instance setup has been successful. Next, packet data transfer is performed between the mobile station 12 and another end station (at 114).

At some point, the mobile station 12 goes dormant (at 116). For example, if a user is browsing the web on the mobile station 12, and the user has paused for whatever reason, no further data is exchanged between the mobile station 12 and the other end station during this period of inactivity. Also, there is the possibility that the mobile station 12 goes out of radio coverage of the mobile communications network (at 118). This may occur due to obstructions causing gaps in the coverage area of the mobile communications network. Alternatively, a user may be on the edge of the mobile communications network, and the resultant weak signaling may cause the mobile station to go in and out of radio coverage.

In the PDSN 16, the PPP inactivity timer 30 starts running when it detects inactivity in the communications session between the mobile station 12 and the other end station. Upon expiration (at 120) of the inactivity timer 30, the PDSN 16 sends (at 122) an LCP-Echo Request message to the radio network 14. The LCP-Echo Request message is intended to elicit an LCP-Echo-Reply/Reject message (a response message) from the mobile station. Note that instead of the LCP-Echo Request message, other types of echo messages can be employed. More generally, an "echo" message refers to any message that is sent from a first node to a second node for the purpose of eliciting a response from the second node for indicating that the second node remains connected to the communications session.

In response to the LCP-Echo Request message, the base station controller 18 in the radio network 14 pages (at 124) the mobile station 12. The example of FIG. 2 assumes that the mobile station is currently out of radio coverage, so that the mobile station 12 does not receive this page from the radio network 14. As a result, no response is received from the mobile station for some time-out period. The wireless session between the mobile station 12 and the radio network 14 has effectively been terminated (since the mobile station became dormant), thus requiring the radio network 14 to page the mobile station 12 to reestablish the wireless session. Note that the wireless session can be terminated without terminating the PPP or other packet data session involving the mobile station 12.

When the radio network 14 detects (at 125) no response from the mobile station by the end of the time-out period, the radio network 14 sends (at 126) an A9/A11 Registration-Request message with a parameter Lifetime set equal to zero. This effectively is an R-P teardown request for tearing down the communications session.

In response to receiving this request to terminate the communications session, the PDSN 16 determines (at 128) whether the retries counter 32 has a count that is greater than zero. If so, the PDSN 16 sends an A9/A11 Registration-Reply message back to the radio network 14. Normally, the PDSN 16, in response to the teardown request, sends back an A9/A11 Registration-Reply message (with the Lifetime parameter set to zero and an accept indicator set to acknowledge the teardown request). Note that the Registration-Reply message is an A11 message sent from the PDSN 16 to the PCF 20. In response to the A11 Registration Reply message, the PCF 20 sends an A9-release-A8 complete message to the BSC 18. Similarly, to initiate the Registration-Request message with Lifetime=0, the BSC 18 send an A9-release-A8 message with a Cause value set to "normal call release" to instruct the PCF 20 to release the associated dedicated resource and the associated A10 connection.

However, in accordance with some embodiments of the invention, if the retries counter count value is greater than zero, the PDSN 16 does not accept the teardown request, but instead sends back an A11 Registration-Reply message (at 130) with a NACK (or no-acknowledge) indicator. The no-acknowledge indicator is effectively an indication that the teardown request is denied so that the radio network 14 is not allowed to teardown the communications session. In response to this, the radio network 14 does nothing to teardown the communications session.

In conjunction with sending the NACK indicator in the A11 Registration-Reply message, the PDSN 16 also decrements (at 132) the retries counter 32. Assume that this decrement causes the retries counter 32 to be decremented to zero. The PDSN 16 sends another LCP-Echo message (at 136) to the radio network 14. Since the mobile station is still out of radio coverage, the radio network 14 pages (at 138) the mobile station 12. If no response is received from the mobile station 12, and after a preset time-out period (at 140), the radio network 14 sends (at 142) an A11 Registration-Request message with the parameter Lifetime set equal to zero to perform an R-P teardown request. At this time, the PDSN 16 determines (at 144) that the retries counter has a zero value. Therefore, the PDSN enables the R-P teardown procedure by sending an A11 Registration-Reply message with Lifetime=0 and an accept indicator (at 146) to the radio network 14. After subsequent exchanges of messaging, the R-P connection is terminated, along with the PPP session.

Instructions of the various software routines or modules discussed herein (such as the link status determination module 82, the inactivity timer 30, and the retries counter 32) are loaded for execution on corresponding control units or processors. The control units or processors include microprocessors, microcontrollers, processor modules or subsystems (including one or more microprocessors or microcontrollers), or other control or computing devices. As used here, a "controller" refers to hardware, software, or a combination thereof. A "controller" can refer to a single component or to plural components (whether software or hardware).

Data and instructions (of the various software routines or modules) are stored in one or more machine-readable storage media. The storage media include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; and optical media such as compact disks (CDs) or digital video disks (DVDs).

The instructions of the software routines or modules are loaded or transported to a system in one of many different ways. For example, code segments including instructions stored on floppy disks, CD or DVD media, a hard disk, or transported through a network interface card, modem, or other interface device are loaded into the system and executed as corresponding software routines or modules. In the loading or transport process, data signals that are embodied in carrier waves (transmitted over telephone lines, network lines, wireless links, cables, and the like) communicate the code segments, including instructions, to the system. Such carrier waves are in the form of electrical, optical, acoustical, electromagnetic, or other types of signals.

While the invention has been disclosed with respect to a limited number of embodiments, those skilled in the art will appreciate numerous modifications and variations therefrom. It is intended that the appended claims cover such modifications and variations as fall within the true spirit and scope of the invention.

What is claimed is:

1. A method for use in a mobile communications network, comprising:
   receiving a request from a base station controller to terminate a communications session with a mobile station;
   in response to receiving the request to terminate, checking an indicator to determine whether the communications session is to be maintained for the mobile station; and
   in response to determining that the communications session is to be maintained for the mobile station, generating a message to deny the request to terminate the communications session.

2. The method of claim 1, wherein receiving the message comprises receiving the message by a packet data serving node (PDSN).

3. The method of claim 2, further comprising sending the message to deny the request from the PDSN to the base station controller.

4. The method of claim 1, further comprising determining whether the mobile station is an always-on mobile station.

5. The method of claim 4, further comprising determining whether the mobile station is a code-division multiple access (CDMA) always-on mobile station.

6. The method of claim 1, wherein generating the message to deny the request comprises generating a NACK message, the method further comprising sending the NACK message to the base station controller to deny the request to terminate the communications session.

7. The method of claim 6, wherein receiving the request to terminate comprises receiving an A11 Registration Request with a Lifetime parameter set to zero.

8. The method of claim 7, wherein generating the NACK message comprises generating an A11 Registration-Reply message with a no-acknowledge indicator.

9. The method of claim 1, further comprising counting a number of attempts made to reach the mobile station, wherein determining that the communications session is to be maintained for the mobile station is in response to detecting that less than a predetermined number of attempts have been made.

10. The method of claim 9, further comprising sending an echo message to the mobile station in each attempt to reach the mobile station.

11. The method of claim 9, further comprising:
starting an inactivity timer; and
in response to expiration of the inactivity timer, sending an echo message to a mobile station.

12. The article of claim 11, wherein generating the message to deny the request comprises generating a NACK message, the instructions when executed causing the node to further send the NACK message to the wireless network to deny the request to terminate.

13. The article of claim 12, wherein receiving the request to terminate comprises receiving an A11 Registration Request with a Lifetime parameter set to zero.

14. The article of claim 11, wherein the instructions when executed cause the node to count a number of attempts made to reach the mobile station, wherein determining that the communications session is to be maintained for the mobile station is in response to detecting that less than a predetermined number of attempts have been made.

15. The article of claim 14, wherein the instructions when executed cause the node to send an echo message to the mobile station in each attempt to reach the mobile station.

16. An article comprising at least one storage medium containing instructions that when executed cause a node to:
receive, from a wireless network, a request to terminate a communications session with a mobile station;
in response to receiving the request to terminate, checking an indicator to determine whether the communications session is to be maintained for the mobile station; and
in response to determining that the communications session is to be maintained for the mobile station, generating a message to deny the request to terminate the communications session.

17. The article of claim 16, wherein receiving the message comprises receiving the message from a base station controller in the wireless network.

18. The article of claim 17, wherein the node comprises a packet data serving node (PDSN).

19. The article of claim 17, wherein the instructions when executed cause the node to determine whether the mobile station is an always-on mobile station.

20. The article of claim 19, wherein the instructions when executed cause the node to exchange messaging with an Authentication, Authorization, and Accounting server to determine whether the mobile station is an always-on mobile station.

21. A node comprising:
an interface to receive, from a wireless network, a request to terminate a communications session with a mobile station; and
in response to the request, a controller to check an indicator to determine whether the communications session is to be maintained for the mobile station, and in response to determining that the communications session is to be maintained for the mobile station, send a message to the wireless network to deny the request to terminate the communications session.

22. The node of claim 21, wherein the controller is adapted to determine whether the mobile station is an always-on mobile station.

23. The node of claim 21, comprising a packet data node.

24. The node of claim 21, comprising a CDMA packet data serving node.

25. The node of claim 21, wherein the message is an A11 Registration-Reply message with a no-acknowledge indication.

* * * * *